United States Patent
Zhou et al.

(10) Patent No.: US 10,779,284 B2
(45) Date of Patent: Sep. 15, 2020

(54) DATA TRANSMISSION METHOD, USER EQUIPMENT, AND BASE STATION

(71) Applicant: HUAWEI TECHNOLOGIES CO., LTD., Shenzhen (CN)

(72) Inventors: Guohua Zhou, Shanghai (CN); Dongdong Wei, Shanghai (CN); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/892,419

(22) Filed: Feb. 9, 2018

(65) Prior Publication Data

US 2018/0167928 A1 Jun. 14, 2018

Related U.S. Application Data

(63) Continuation of application No. PCT/CN2015/086807, filed on Aug. 12, 2015.

(51) Int. Cl.
| | |
|---|---|
| *H04W 52/02* | (2009.01) |
| *H04W 72/04* | (2009.01) |
| *H04W 40/22* | (2009.01) |
| *H04L 5/00* | (2006.01) |
| *H04W 40/12* | (2009.01) |
| *H04W 88/04* | (2009.01) |

(52) U.S. Cl.
CPC ......... *H04W 72/048* (2013.01); *H04W 40/22* (2013.01); *H04W 72/0413* (2013.01); *H04L 5/005* (2013.01); *H04W 40/12* (2013.01); *H04W 72/042* (2013.01); *H04W 72/0446* (2013.01); *H04W 88/04* (2013.01)

(58) Field of Classification Search
CPC ........... H04W 72/048; H04W 72/0413; H04W 40/22; H04W 40/12; H04W 72/042; H04L 5/005
See application file for complete search history.

(56) References Cited

U.S. PATENT DOCUMENTS 8,228,841 B2 * 7/2012 Jung ................. H04W 72/1289
   370/328
8,619,663 B2 * 12/2013 Seo ........................ H04B 7/155
   370/278

(Continued)

FOREIGN PATENT DOCUMENTS

| CN | 101908955 A | 12/2010 |
|---|---|---|
| CN | 102780993 A | 11/2012 |

(Continued)

*Primary Examiner* — Phuc H Tran
(74) *Attorney, Agent, or Firm* — Kilpatrick Townsend & Stockton LLP (57) ABSTRACT

Embodiments of the present application provide a data transmission method. The method includes: sending, by user equipment, uplink data to a base station by using an uplink user equipment relay; and receiving, by the user equipment, downlink data from the base station, or receiving, by the user equipment, downlink data from the base station by using a downlink user equipment relay. Uplink transmission and downlink transmission are separately performed in different transmission paths, so as to reduce impact of a fault of a user equipment relay on a network, and improve network reliability.

18 Claims, 4 Drawing Sheets

(56) References Cited

U.S. PATENT DOCUMENTS

| | | | |
|---|---|---|---|
| 8,873,455 B2* | 10/2014 | Speight | H04W 88/04 370/315 |
| 8,934,333 B2* | 1/2015 | Kim | H04L 1/1819 370/216 |
| 8,982,864 B2* | 3/2015 | Takano | H04L 5/0037 370/341 |
| 9,350,508 B2* | 5/2016 | Gan | H04B 7/155 |
| 2005/0222948 A1 | 10/2005 | Sato et al. | |
| 2011/0038294 A1* | 2/2011 | Zhou | H04B 7/155 370/311 |
| 2012/0127888 A1* | 5/2012 | Fujishima | H04W 72/085 370/252 |
| 2012/0140702 A1* | 6/2012 | Takano | H04W 72/08 370/315 |
| 2013/0058264 A1* | 3/2013 | Gan | H04B 7/155 370/279 |
| 2014/0112158 A1* | 4/2014 | Tavildar | H04B 7/2606 370/246 |
| 2014/0112162 A1 | 4/2014 | Tavildar et al. | |
| 2014/0233454 A1* | 8/2014 | Speight | H04W 88/04 370/315 |
| 2014/0286233 A1* | 9/2014 | Chung | H04W 76/27 370/315 |
| 2015/0103731 A1* | 4/2015 | Jeon | H04J 11/00 370/315 |
| 2015/0215764 A1 | 7/2015 | Tavildar et al. | |
| 2015/0236777 A1* | 8/2015 | Akhtar | H04W 48/20 455/438 |
| 2015/0289172 A1* | 10/2015 | Choi | H04W 36/0055 455/437 |
| 2016/0302181 A1 | 10/2016 | Fujishiro et al. | |
| 2017/0311338 A1* | 10/2017 | Tanaka | H04W 72/0413 |
| 2017/0318582 A1 | 11/2017 | Au et al. | |

FOREIGN PATENT DOCUMENTS

| | | |
|---|---|---|
| CN | 103188706 A | 7/2013 |
| CN | 103684715 A | 3/2014 |
| CN | 104620629 A | 5/2015 |
| CN | 104737468 A | 6/2015 |
| CN | 104756552 A | 7/2015 |
| WO | 2014179294 A2 | 11/2014 |
| WO | 2015093560 A1 | 6/2015 |

* cited by examiner

DATA TRANSMISSION METHOD, USER EQUIPMENT, AND BASE STATION

CROSS-REFERENCE TO RELATED APPLICATIONS

This application is a continuation of International Application No. PCT/CN2015/086807, filed on Aug. 12, 2015, the disclosure of which is hereby incorporated by reference in its entirety.

TECHNICAL FIELD

The present application relates to the field of communications technologies, and in particular, to a data transmission technology.

BACKGROUND

Figure 1:
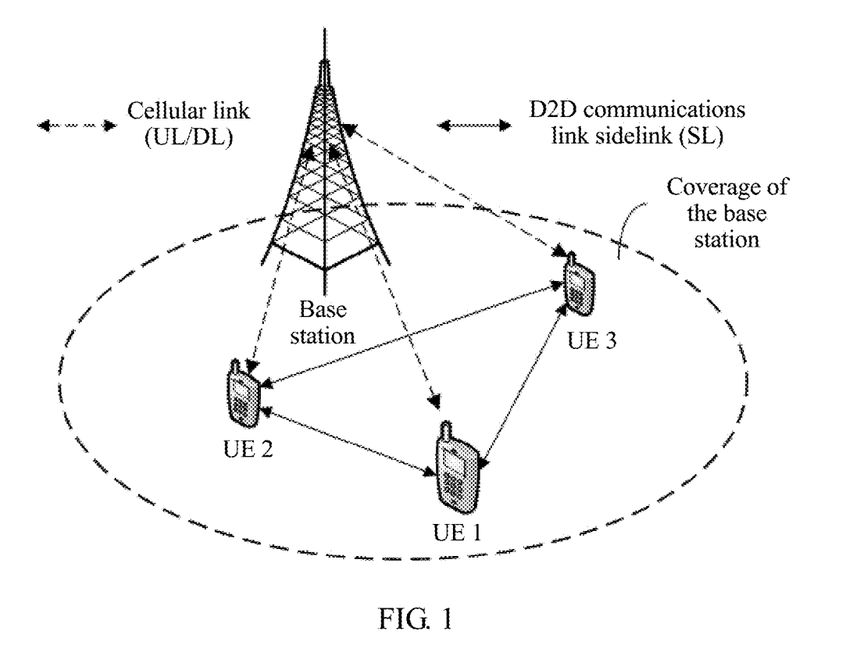
FIG. 1 is a schematic diagram of a wireless network using a D2D technology according to an embodiment of the present application.

With development of wireless technologies, a device-to-device D2D) communication technology is proposed to relieve network load. User equipments (UEt) within a particular distance range may directly communicate with each other by using the D2D communication technology (D2D technology for short), and a third-party device such as a base station does not need to be used for relaying. As shown in FIG. 1, in coverage of a base station, the base station may separately communicate with UE 1, UE 2, and UE 3 by using a cellular link. After the D2D technology is used, the UE 1 can directly communicate with the UE 2 or the UE 3 by using a D2D communications link (also referred to as a slide link, SL for short), the UE 2 can directly communicate with the UE 1 or the UE 3 by using the SL, and the UE 3 can communicate with the UE 1 or the UE 2 by using the SL.

In the D2D technology, an idea that user equipment is used as a relay node is proposed to improve a network communication capability. However, how to improve communication reliability of a network using the D2D technology is an urgent problem to be resolved.

SUMMARY

Embodiments of the present application provide a data transmission method, user equipment, and a base station, so as to improve reliability of a network using a D2D technology.

According to a first aspect, an embodiment of the present application provides a data transmission method, including: sending, by user equipment (UE), uplink data to a base station by using an uplink user equipment relay (uplink UE-relay); and receiving, by the UE, downlink data from the base station, or receiving, by the UE, downlink data from the base station by using a downlink user equipment relay (downlink UE-relay).

A person skilled in the art may understand that receiving the downlink data from the base station is directly receiving the downlink data from the base station without using a user equipment relay.

In a possible design, the method further includes: sending, by the UE, first indication information to the uplink UE-relay. The first indication information indicates an uplink transmission resource corresponding to the UE, so that the uplink UE-relay sends the uplink data to the base station according to the uplink transmission resource. The uplink UE-relay transmits the uplink data by using the uplink transmission resource corresponding to the UE, and therefore, the base station does not learn that the uplink data is sent by the uplink UE-relay. This avoids extra processing by the base station, and reduces overheads of the base station.

Optionally, the uplink transmission resource includes a physical uplink control channel (PUCCH) resource. The first indication information includes $n_{CCE}$ and $N_{PUCCH}^{(1)}$, where $n_{CCE}$ indicates a number of a first control channel element (CCE) that is in a physical downlink control channel (PDCCH) and that indicates downlink transmission, and $N_{PUCCH}^{(1)}$ indicates a UE-dedicated PUCCH ACK/NACK (acknowledgement/negative acknowledgement) resource offset or used to indicate a PUCCH format 1a/1b start offset used for a subframe set K2. Acting as the UE, the uplink UE-relay can send a reply of the UE to the downlink data to the base station by using the PUCCH resource of the UE, so that the base station can immediately learn that the UE replies to the downlink data. In this way, an existing hybrid automatic repeat request (HARQ) procedure is less affected.

Optionally, the first indication information may further include $n_{PUCCH}^{(2,\tilde{p})}$ and $n_{PUCCH}^{(2,\tilde{p})}$ indicates an index of a channel quality indicator (CQI) allocated to the UE. The uplink UE-relay may feed back a periodic CQI of the UE to the base station on the PUCCH resource according to $n_{PUCCH}^{(2,\tilde{p})}$.

Optionally, for different uplink transmission resources, the first indication information includes different parameters. These parameters are described in detail in embodiments.

Optionally, the uplink data is received by the base station according to the PUCCH resource after a delay of m transmission time intervals (TTI), and m is a positive integer. Optionally, the m TTIs are greater than or equal to a time consumed when the UE sends the first indication information and the uplink data to the uplink UE-relay. The uplink data is received after the delay of m TTIs, so as to help increase a probability that the base station correctly receives the uplink data from the uplink UE-relay.

In another possible design, the method further includes: receiving, by the UE, second indication information from the uplink UE-relay, where the second indication information indicates a downlink transmission resource corresponding to the uplink UE-relay; and the receiving, by the UE, downlink data from the base station includes: receiving, by the UE, the downlink data from the base station according to the downlink transmission resource.

Optionally, the downlink transmission resource includes a PHICH resource. The second indication information includes $n_{DMRS}$ and $I_{PRB\_RA}^{lowest\_index}$, where $n_{DMRS}$ indicates a demodulation reference signal (DMRS) offset, and $I_{PRB\_RA}^{lowest\_index}$ indicates a minimum index of a physical resource block (PRB) for uplink transmission.

After learning of the downlink transmission resource corresponding to the uplink UE-relay, the UE may directly receive a reply of the base station to the uplink data from the base station, so as to prevent the uplink UE-relay from forwarding the reply. This further improves network reliability.

In another possible design, the method further includes: receiving, by the UE, a reply of the uplink UE-relay to the uplink data from the uplink UE-relay. The UE may learn, by using the reply, whether the UE has correctly sent the uplink data to the uplink UE-relay, so that the UE determines whether to resend the uplink data. This improves reliability of uplink data transmission.

In another possible design, the method further includes: sending, by the UE, a reply of the UE to the downlink data to the downlink UE-relay. The downlink UE-relay may learn, by using the reply, whether the downlink UE-relay has successfully sent the downlink data to the UE, so that the downlink UE-relay determines whether to resend the downlink data. This improves reliability of downlink data transmission.

According to a second aspect, an embodiment of the present application provides UE, and the UE includes a corresponding module for executing an action of the UE in the method in the first aspect. The module may be software and/or hardware.

In a possible design, the UE includes a processor and a memory, and the processor is configured to support the UE in executing corresponding functions in the method in the first aspect. The memory is coupled to the processor, and stores a program instruction and data that are required by the UE.

According to a third aspect, an embodiment of the present application provides a data transmission method, including: receiving, by a base station, uplink data of UE by using an uplink UE-relay; and sending, by the base station, downlink data to the UE, or sending, by the base station, downlink data to the UE by using a downlink UE-relay.

In a possible design, the receiving, by a base station, uplink data of UE by using an uplink UE-relay includes: receiving, by the base station, the uplink data of the UE from the uplink UE-relay according to an uplink transmission resource corresponding to the UE. After receiving, on the uplink transmission resource corresponding to the UE, the uplink data forwarded by the uplink UE-relay, the base station considers that the uplink data is sent by the UE, so as to prevent the base station from identifying a source of the uplink data by means of extra processing.

In another possible design, the receiving, by the base station, the uplink data of the UE from the uplink UE-relay according to an uplink transmission resource corresponding to the UE includes: receiving, by the base station, the uplink data from the uplink UE-relay according to the uplink transmission resource after a delay of m transmission time intervals TTIs, where m is a positive integer. The uplink data is received after the delay of m TTIs, so as to increase a success rate of receiving the uplink data by the base station.

According to a fourth aspect, an embodiment of the present application provides a base station, and the base station includes a corresponding module for executing an action of the base station in the method in the third aspect. The module may be software and/or hardware.

In a possible design, the base station includes a processor and a memory, and the processor is configured to support the base station in implementing corresponding functions in the method in the third aspect. The memory is coupled to the processor, and stores a program instruction and data that are required by the base station.

According to a fifth aspect, an embodiment of the present application provides a data transmission method, including: receiving, by a user equipment relay, uplink data from user equipment; sending, by the user equipment relay, the uplink data to a base station; and sending, by the user equipment relay, second indication information to the user equipment, where the second indication information indicates a PHICH resource corresponding to the user equipment relay, so that the user equipment receives a reply to the uplink data from the base station according to the PHICH resource.

Optionally, for content of the second indication information, refer to related content in the first aspect.

In a possible design, the method further includes: sending, by the user equipment relay, a reply of the user equipment relay to the uplink data to the user equipment. In this step, the user equipment may learn whether the user equipment has successfully sent the uplink data to the user equipment relay, so that the user equipment determines whether to resend the uplink data. This improves reliability of uplink data transmission.

According to a sixth aspect, an embodiment of the present application provides a user equipment relay. The user equipment relay includes a corresponding module for executing an action of the uplink UE-relay in the method in the fifth aspect. The module may be software and/or hardware.

In a possible design, the user equipment relay includes a processor and a memory, and the processor is configured to support the user equipment relay in implementing corresponding functions in the method in the fifth aspect. The memory is coupled to the processor, and stores a program instruction and data that are required by the user equipment relay.

According to a seventh aspect, an embodiment of the present application provides a data transmission method, including: receiving, by a user equipment relay, first indication information from user equipment, where the first indication information indicates a PUCCH resource corresponding to the user equipment; receiving, by the user equipment relay, uplink data from the user equipment; and sending, by the user equipment relay, the uplink data to a base station according to the PUCCH resource.

Optionally, for content of the first indication information, refer to related content in the first aspect.

In a possible design, the method further includes: sending, by the user equipment relay, a reply to the uplink data to the user equipment. In this step, the user equipment may learn whether the user equipment has successfully sent the uplink data to the user equipment relay, so that the user equipment determines whether to resend the uplink data. This improves reliability of uplink data transmission.

According to an eighth aspect, an embodiment of the present application provides a user equipment relay. The user equipment relay includes a corresponding module for executing an action of the uplink UE-relay in the method in the seventh aspect. The module may be software and/or hardware.

In a possible design, the user equipment relay includes a processor and a memory, and the processor is configured to support the user equipment relay in implementing corresponding functions in the method in the seventh aspect. The memory is coupled to the processor, and stores a program instruction and data that are required by the user equipment relay.

According to a ninth aspect, an embodiment of the present application provides a data transmission system, including the foregoing UE and the foregoing uplink UE-relay. For an operation mechanism of the system, refer to related content in the foregoing aspects.

In a possible design, the system may further include the base station in the foregoing aspects.

According to a tenth aspect, an embodiment of the present application provides a computer storage medium, and the computer storage medium includes a program designed to perform the foregoing aspects.

In the foregoing aspects, transmit power required for sending the uplink data to the uplink UE-relay by the UE is less than transmit power required for directly sending the uplink data to the base station by the UE. Therefore, power consumption of the UE can be reduced. Preferably, a distance between the UE and the uplink UE-relay is shorter than a distance between the UE and the base station. Optionally, communication between the UE and the uplink UE-relay or between the UE and the downlink UE-relay may be performed in a unicast or broadcast manner. This is not limited in the embodiments of the present application.

According to the solutions provided in the embodiments of the present application, uplink transmission and downlink transmission are separately performed in different transmission paths, so as to reduce impact of a fault of the UE-relay on a network, and improve network reliability. In addition, the UE directly receives the downlink data from the base station, and transmits the uplink data by using the UE-relay, and the UE may perform data sending by using relatively small transmit power, so as to reduce power consumption of the UE, and improve an endurance capability of the UE. Further, at a location in proximity of an edge of coverage of the base station, because downlink transmission quality is better than uplink transmission quality, uplink transmission directly performed between the UE and the base station is switched to relaying performed by using the UE-relay, so as to improve uplink transmission quality of the UE. Besides, an uplink transmission distance of the UE may be less than the coverage of the base station due to limitation of maximum transmit power of the UE. Therefore, uplink transmission directly performed between the UE and the base station is switched to relaying performed by using the UE-relay, so as to increase the uplink transmission distance of the UE.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

A network architecture and a service scenario described in the embodiments of the present application are intended to describe the technical solutions in the embodiments of the present application more clearly, but do not constitute a limitation on the technical solutions provided in the embodiments of the present application. A person of ordinary skill in the art may understand that, with evolution of a network architecture and emergence of a new service scenario, the technical solutions provided in the embodiments of the present application are also applicable to a similar technical problem.

For ease of understanding, the embodiments of the present application are described by using a Long Term Evolution (LTE) network defined in the $3^{rd}$ Generation Partnership Project (3GPP) as an example. 3GPP is a project devoted to developing a wireless communications network. Unless otherwise specified in the embodiments, the LTE network in the embodiments of the present application complies with 3GPP standards. A person skilled in the art may understand that the solutions in the embodiments of the present application may be applied to another wireless communications network such as a Universal Mobile Telecommunications System (UMTS) network, a 5G network, or a subsequent evolved network.

FIG. 1 shows an example of a communications network using a D2D technology. As shown in FIG. 1, UEs (UE 1, UE 2, and UE 3) in coverage of a base station may communicate with the base station, and the UEs may communicate with each other by establishing a D2D link. For example, in FIG. 1, when the UE (for example, the UE 1) is on a cell edge, quality of communication between the UE and the base station is relatively poor, but quality of communication between the UE 2 or the UE 3 and the base station may be better. Therefore, the UE 2 or the UE 3 may be used as a relay node to relay communication between the UE 1 and the base station, so as to ensure quality of the communication between the UE 1 and the base station.

For ease of understanding, some terms in this application are described below.

User equipment (UE) is a terminal device having a communication function, and may include a handheld device, an in-vehicle device, a wearable device, a computation device, another processing device connected to a wireless modem, or the like that has a wireless communication function. The user equipment may have different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. For ease of description, these devices are abbreviated as user equipment or UE in this application.

User equipment with a relay function may also be referred to as a user equipment relay (UE-relay).

Figure 2:
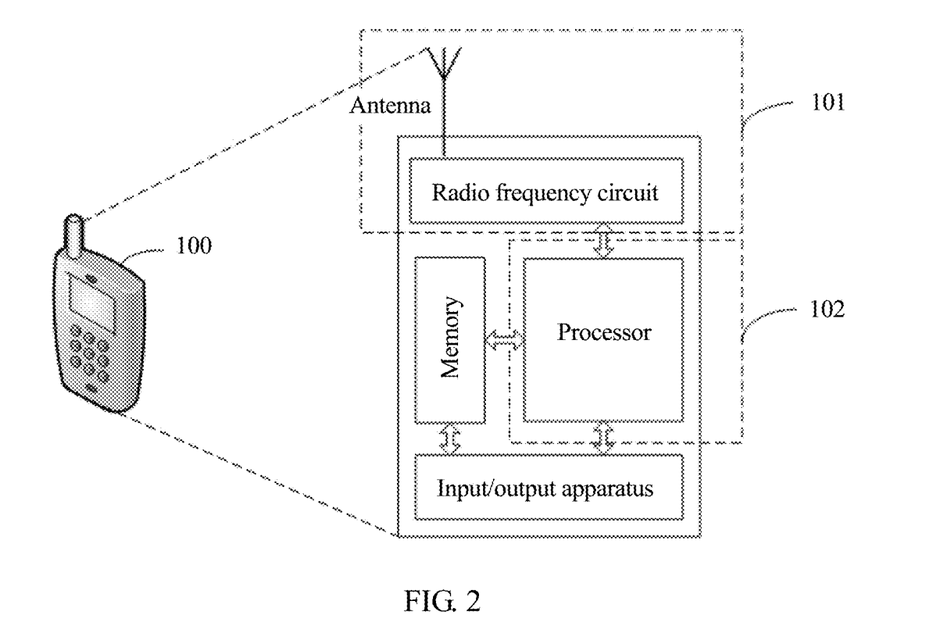
FIG. 2 is a schematic structural diagram of user equipment according to an embodiment of the present application.

FIG. 2 is a schematic structural diagram of user equipment. For ease of description, FIG. 2 shows only main components of the user equipment. As shown in FIG. 2, user equipment 100 includes a processor, a memory, a radio frequency circuit, an antenna, and an input/output apparatus. The processor is mainly configured to: process a communications protocol and communication data, control the entire user equipment, execute a software program, and process data of the software program. The memory is mainly configured to store a software program and data. The radio frequency circuit is mainly configured to: convert a baseband signal and a radio frequency signal, and process the radio frequency signal. The antenna is mainly configured to receive and send a radio frequency signal in an electromagnetic wave form. The input/output apparatus, such as a touchscreen, a screen, or a keyboard, is mainly configured to: receive data entered by a user, and output data to the user.

A person skilled in the art may understand that the structure of the user equipment shown in FIG. 2 is applicable to the UE 1, the UE 2, and the UE 3 in FIG. 1.

After the user equipment is powered on, the processor may read the software program in the storage unit, explain and execute an instruction of the software program, and process the data of the software program. When the processor needs to send data in a wireless manner, the processor outputs a baseband signal to the radio frequency circuit after performing baseband processing on the to-be-sent data. After performing radio frequency processing on the baseband signal, the radio frequency circuit sends a radio frequency signal in an electromagnetic wave form by using the antenna. When data is sent to the user equipment, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 2 shows only one memory and only one processor. Actually, the user equipment may include multiple processors and multiple memories. The memory may also be referred to as a storage medium, a storage device, or the like. This is not limited in this embodiment of the present application.

In an optional implementation, the processor may include a baseband processor and a central processing unit. The baseband processor is mainly configured to process a communications protocol and communication data, and the central processing unit is mainly configured to: control the entire user equipment, execute a software program, and process data of the software program. The processor in FIG. 2 integrates functions of the baseband processor and the central processing unit. A person skilled in the art may understand that the baseband processor and the central processing unit may be separate processors, and are interconnected by using a technology such as a bus. A person skilled in the art may understand that the user equipment may include multiple baseband processors to adapt to different network standards. A person skilled in the art may understand that the user equipment may include multiple central processing units to enhance a processing capability of the user equipment.

A person skilled in the art may understand that the components of the user equipment may be connected by using various buses.

A person skilled in the art may understand that the baseband processor may also be expressed as a baseband processing circuit or a baseband processing chip.

A person skilled in the art may understand that the central processing unit may also be expressed as a central processing circuit or a central processing chip.

A person skilled in the art may understand that a function of processing the communications protocol and the communication data may be embedded in the processor, or may be stored in the storage unit in a form of a software program. The processor executes the software program to implement a baseband processing function.

For example, in this embodiment of the present application, the antenna and the radio frequency circuit that have receiving and sending functions may be considered as a transceiver unit of the user equipment, and the processor having a processing function may be considered as a processing unit of the user equipment. As shown in FIG. 2, the user equipment UE 100 includes a transceiver unit 101 and a processing unit 102. The transceiver unit may also be referred to as a transceiver, a transceiver machine, a transceiver apparatus, or the like. Optionally, a component that is in the transceiver unit 101 and configured to implement a receiving function may be considered as a receiving unit, and a component that is in the transceiver unit 101 and configured to implement a sending function may be considered as a sending unit. That is, the transceiver unit 101 includes the receiving unit and the sending unit. For example, the receiving unit may also be referred to as a receiver machine, a receiver, or a receiver circuit; the sending unit may be referred to as a transmitter machine, a transmitter, or a transmit circuit.

A base station (BS) may also be referred to as a base station device, and is a device deployed in a radio access network to provide a wireless communication function. A base station in an LTE network is referred to as an evolved NodeB (eNB or eNodeB).

Figure 3:
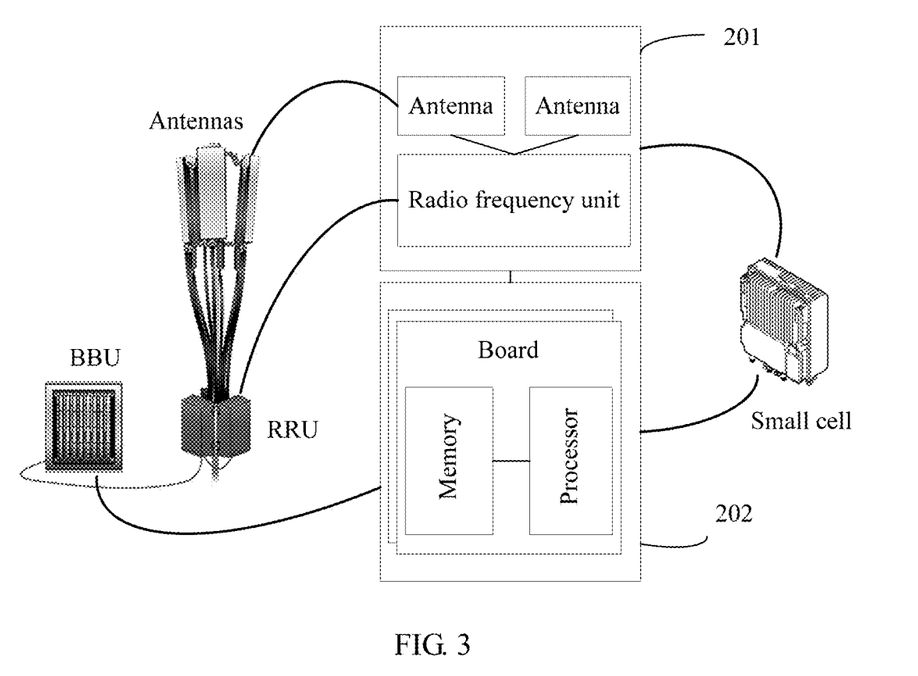
FIG. 3 is a schematic structural diagram of a base station according to an embodiment of the present application.

FIG. 3 is a schematic structural diagram of a base station. The base station shown in FIG. 3 may be a distributed base station. For example, on the left of FIG. 3, a distributed base station including an antenna (antennas), a remote radio unit (RRU), and a baseband unit (BBU) is shown. Alternatively, the base station shown in FIG. 3 may be an integrated base station such as a small cell (small cell) shown on the right of FIG. 3. Generally, the base station includes a part 201 and a part 202. The part 201 is mainly configured to: receive and send a radio frequency signal, and convert the radio frequency signal and a baseband signal. The part 202 is mainly configured to: perform baseband processing, control the base station, and the like. The part 201 may be usually referred to as a transceiver unit, a transceiver machine, a transceiver circuit, a transceiver, or the like. The part 202 may be usually referred to as a processing unit. Generally, the part 202 is a control center of the base station.

As shown in FIG. 3, in an optional implementation, the part 201 may include an antenna and a radio frequency unit. The radio frequency unit is mainly configured to perform radio frequency processing. Optionally, a component that is in the part 201 and configured to implement a receiving function may be considered as a receiving unit, and a component that is in the part 201 and configured to implement a sending function may be considered as a sending unit. That is, the part 201 includes the receiving unit and the sending unit. For example, the receiving unit may also be referred to as a receiver machine, a receiver, or a receiver circuit; the sending unit may be referred to as a transmitter machine, a transmitter, or a transmit circuit.

As shown in FIG. 3, in an optional implementation, the part 202 may include one or more boards. Each board may include a processor and a memory, and the processor is configured to read and execute a program in the memory to implement a baseband processing function and control the base station. If there are multiple boards, the boards may be interconnected to enhance a processing capability.

In another optional implementation, with development of a system-on-chip (SoC) technology, functions of the part 202 and the part 201 may be implemented by using the SoC technology, that is, the functions of the part 202 and the part 201 may be implemented by using a functional chip of the base station. The functional chip of the base station integrates components such as the processor, the memory, and the antenna. A program having related functions of the base station is stored in the memory, and the processor executes the program to implement the related functions of the base station.

In the network shown in FIG. 1, by using the D2D technology, the UE 1 may communicate with the base station by using the UE 2, that is, the UE 1 may exchange both uplink data and downlink data with the base station by using the UE 2. Because quality of a signal between the UE 2 and the base station or between the UE 2 and the UE 1 may be poorer due to movement of the UE 2, or a case such as power off or a fault may occur in a relay process, network reliability may decrease when a relay function is implemented by using the user equipment.

Figure 4:
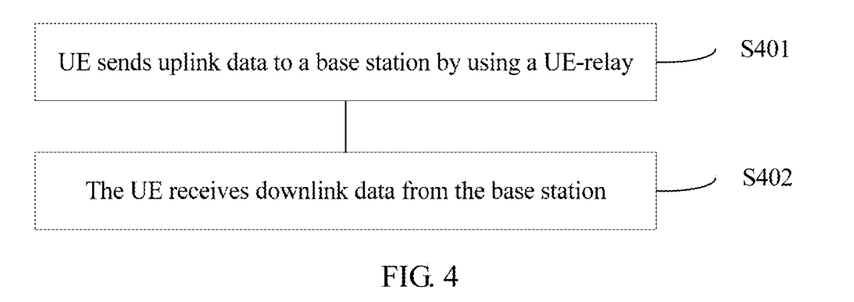
FIG. 4 is a schematic diagram of a data transmission method according to an embodiment of the present application.

An embodiment of the present application provides a data transmission method. As shown in FIG. 4, in S401, UE sends uplink data to a base station by using a UE-relay. When the UE-relay is used to relay the uplink data, the UE-relay may also be referred to as an uplink UE-relay. That is, a transmission path of the uplink data of the UE is UE→(uplink UE-relay)→BS. In an optional implementation of S401, a sending unit of the UE may be configured to send the uplink data to the base station by using the UE-relay, and a transceiver unit of the base station (or a receiving unit in a transceiver unit of the base station) may be configured to receive the uplink data of the UE by using the UE-relay.

In S402, the UE receives downlink data sent by the base station. In an optional implementation of S402, a receiving unit of the UE may be configured to receive the downlink data sent by the base station, and the transceiver unit of the base station (or a sending unit in the transceiver unit of the base station) may be configured to send the downlink data to the UE.

Specifically, in an example, the UE may receive, from the base station, the downlink data sent by the base station. That is, a transmission path of the downlink data is BS→UE, and a transmission path of the uplink data is UE→(uplink UE-relay)→BS. When this example is applied to the network shown in FIG. 1, assuming that the UE 1 is used as the UE in FIG. 3, the uplink UE-relay may be any UE having a relay function in the network, for example, the UE 2 or the UE 3. In this example, the transmission path of the uplink data between the UE and the base station is different from the transmission path of the downlink data between the UE and the base station. The UE-relay is used only on a link of the uplink data, so as to reduce impact of the UE-relay on network reliability, and improve reliability of a network using a D2D technology.

In another example, the UE may also receive, by using the UE-relay, the downlink data sent by the base station. When the UE-relay is used to relay the downlink data, the UE-relay may also be referred to as a downlink UE-relay. That is, in this example, a transmission path of the uplink data is UE→(uplink UE-relay)→BS, and a transmission path of the downlink data is BS→(downlink UE-relay)→UE. In an optional implementation, the receiving unit of the UE may be configured to receive, by using the UE-relay, the downlink data sent by the base station, and the transceiver unit of the base station (or the sending unit in the transceiver unit of the base station) may be configured to send the downlink data to the downlink UE-relay. In addition, in this example, because uplink transmission and downlink transmission of the UE are respectively performed by using the uplink UE-relay and the downlink UE-relay, when the UE leaves coverage of the base station, the UE may still perform uplink transmission and downlink transmission with the base station by using the uplink UE-relay and the downlink UE-relay. That is, a distance of communication between the UE and the base station increases.

The downlink UE-relay and the uplink UE-relay are acted by different user equipments. For example, when this example is applied to the network shown in FIG. 1, assuming that the UE 1 is used as the UE and the downlink UE-relay is the UE 2, the uplink UE-relay is another UE other than the UE 2, for example, the UE 3. In this example, in uplink transmission and downlink transmission, different UE-relays are separately used as the uplink UE-relay and the downlink UE-relay, so as to avoid impact exerted by movement of a single UE-relay or a communication fault on communication between the UE and the base station, and improve reliability of a network using a D2D technology.

Preferably, quality of communication between the downlink UE-relay and the base station is better than quality of communication between the UE and the base station. For example, quality of service (QoS) is better. In this way, quality of downlink transmission of the UE can be improved. Certainly, the present application is not limited thereto.

Preferably, a distance between the UE and the uplink UE-relay may be shorter than a distance between the UE and the base station. In this case, when another factor affecting signal quality is not considered, transmit power required for sending the uplink data to the uplink UE-relay by the UE is less than transmit power required for sending the uplink data to the base station by the UE, so as to help reduce power consumption of the UE, and implement power saving. Optionally, after receiving the uplink data sent by the UE, the uplink UE-relay may send a downlink reply of the uplink UE-relay to the uplink data, such as an ACK/NACK, to the UE. In an optional implementation, the receiving unit of the UE may be configured to receive the downlink reply. A person skilled in the art may understand that a reply may also be expressed as a response.

Optionally, after receiving the downlink data forwarded by the downlink UE-relay, the UE may send a reply to the downlink data, such as an ACK/NACK, to the downlink UE-relay. For example, the sending unit of the UE may be configured to send the reply to the downlink UE-relay.

Optionally, communication between the UE and the user equipment relay (for example, the uplink UE-relay or the downlink UE-relay) may be performed in a unicast or broadcast manner.

After the UE receives the downlink data sent by the base station, the UE needs to send the reply to the downlink data to the base station on a PUCCH resource allocated by the base station to the UE, so that the base station can learn that the reply is sent by the UE for the downlink data. A person skilled in the art should understand that the reply may be understood as one type of the uplink data sent by the UE to the base station.

Preferably, the UE may send first indication information to the uplink UE-relay. The first indication information indicates a PUCCH resource corresponding to the UE. In an optional implementation, the sending unit of the UE may be configured to send the first indication information. A person skilled in the art may understand that the PUCCH resource corresponding to the UE may be expressed as a PUCCH resource allocated to the UE, or a PUCCH resource configured for the UE. After receiving the PUCCH resource, the uplink UE-relay sends a reply of the UE to the base station by using the PUCCH resource. After the base station receives the reply on the PUCCH resource, the base station considers that the reply is sent by the UE for the downlink data.

In an optional implementation, the first indication information may include $n_{CCE}$ and $N_{PUCCH}^{(1)}$, where $n_{CCE}$ indicates a number of a first control channel element (CCE) that is in a physical downlink control channel (PDCCH) and that indicates downlink transmission, and $N_{PUCCH}^{(1)}$ indicates a UE-dedicated PUCCH ACK/NACK offset or used to indicate a PUCCH format 1a/1b start offset used for a subframe set K2.

In an optional implementation, the first indication information may include $n_{ECCE,q}$, $\Delta_{ARO}$ and $N_{PUCCH,q}^{(e1)}$, where $n_{ECCE,q}$ indicates a number of a first ECCE (enhanced control channel element) that is in an EPDCCH-PRB-set q (a PRB set q corresponding to an EPDCCH, where the EPDCCH is an enhanced PDCCH and expressed as an enhanced physical downlink control channel) and that is used to transmit corresponding DCI (downlink control information), $\Delta_{ARO}$ indicates a value of a HARQ-ACK resource offset field in DCI format (for a specific value of $\Delta_{ARO}$ refer to Table 1), and $N_{PUCCH,q}^{(e1)}$ indicates a PUCCH resource start offset corresponding to the EPDCCH-PRB-set q.

TABLE 1

Mapping of ACK/NACK resource offset field in DCI format 1A/1B/1D/1/2A/2/2B/2C/2D to $\Delta_{ARO}$ values

| ACK/NACK resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

In an optional implementation, the first indication information may include $n_{ECCE,q}$, $\Delta_{ARO}$, $N_{PUCCH,q}^{(e1)}$, and n'. For $n_{ECCE,q}$, $\Delta_{ARO}$, and $N_{PUCCH,q}^{(e1)}$, refer to the foregoing content. Details are not described herein again. n' indicates a value of an antenna port used for centralized EPDCCH transmission (for a specific value of n' refer to Table 2).

TABLE 2

Antenna port to use for centralized EPDCCH transmission

| | Normal cyclic prefix | | Extended cyclic prefix |
|---|---|---|---|
| n' | Normal subframes, special subframes, and configurations 3, 4, 8 | Special subframes, and configurations 1, 2, 6, 7, 9 | Any subframe |
| 0 | 107 | 107 | 107 |
| 1 | 108 | 109 | 108 |
| 2 | 109 | — | — |
| 3 | 110 | — | — |

For example, for specific meanings and use manners of these parameters: $n_{CCE}$, $N_{PUCCH}^{(1)}$, $n_{ECCE,q}$, $\Delta_{ARO}$, $N_{PUCCH,q}^{(e1)}$, and n' that are included in the first indication information, refer to content in the chapter 10.1.2.1 in the 3GPP standard: 3GPP TS 36.213 v12.5.0. Details are not described herein.

A person skilled in the art may understand that the parameters: $n_{CCE}$, $N_{PUCCH}^{(1)}$, $n_{ECCE,q}$, $\Delta_{ARO}$, $N_{PUCCH,q}^{(e1)}$, and n' that are included in the first indication information may be applied to an LTE FDD (frequency division duplex) network.

A person skilled in the art may understand that the following parameters included in the first indication information may be applied to an LTE TDD (time division duplex) network.

In an optional implementation, the first indication information may include M, m, $n_{CCE}$, and $N_{PUCCH}^{(1)}$.

In an optional implementation, the first indication information may include $n_{ECCE,q}$, $N_{PUCCH,q}^{(e1)}$, m, $N_{ECCE,q,n-k_{i1}}$, and $\Delta_{ARO}$.

In an optional implementation, the first indication information may include $n_{ECCE,q}$, $N_{PUCCH,q}^{(e1)}$, m, n', and $N_{ECCE,q,n-k_{i1}}$.

For example, for specific meanings and use manners of the parameters: M, m, $n_{CCE}$, $N_{PUCCH}^{(1)}$, $n_{ECCE,q}$, $N_{PUCCH,q}^{(e1)}$, n', $\Delta_{ARO}$, and $N_{ECCE,q,n-k_{i1}}$ that are included in the first indication information and may be applied to the LTE TDD network, refer to content in the chapter 10.1.3.1 in the 3GPP standard: 3GPP TS 36.213 v12.5.0. Details are not described herein.

Optionally, if the UE needs to send a periodic channel quality indicator (CQI) to the base station when sending the reply to the base station, the first indication information may further include $n_{PUCCH}^{(2,\tilde{p})}$. $n_{PUCCH}^{(2,\tilde{p})}$ indicates an index of a CQI allocated to the UE. The uplink UE-relay may send, to the base station by using the first indication information, both the reply of the UE to the uplink data and the CQI fed back by the UE.

Preferably, to enable the base station to correctly receive the reply (or the reply and the periodic CQI) that is to the downlink data and forwarded by the uplink UE-relay on the PUCCH resource, the base station may receive the reply (or the reply and the periodic CQI) on the PUCCH resource after a delay of m transmission time intervals (TTI for short). A person skilled in the art may understand that the reply (or the reply and the periodic CQI) herein may be understood as one type of the uplink data sent by the UE to the base station.

In an optional implementation, the transceiver unit of the base station (or the receiving unit in the transceiver unit of the base station) may be configured to receive the uplink data on the PUCCH resource. Further, the transceiver unit of the base station may receive the uplink data on the PUCCH resource after the delay of m TTIs.

Preferably, the m TTIs are greater than or equal to a time required when the user equipment sends the first indication information and the reply to the downlink data to the uplink UE-relay. In this way, a HARQ procedure is less affected.

After the uplink UE-relay forwards the uplink data of the UE to the base station, the base station sends a reply to the uplink data. Because the uplink data is sent by the uplink UE-relay to the base station, the base station sends the reply on a physical hybrid automatic repeat request indicator channel (PHICH) resource corresponding to the uplink UE-relay, so that the uplink UE-relay can receive the reply. A person skilled in the art may understand that the PHICH resource corresponding to the uplink UE-relay may be expressed as a PHICH resource allocated to the uplink UE-relay, or a PHICH resource configured for the uplink UE-relay.

Preferably, to enable the UE to directly receive the reply of the base station to the uplink data from the base station, the uplink UE-relay may notify the UE of the PHICH resource corresponding to the uplink UE-relay. The UE may receive the reply to the uplink data from the base station according to the PHICH resource. For example, the receiving unit of the UE may be configured to receive second indication information from the uplink UE-relay. The second indication information indicates the PHICH resource corresponding to the uplink UE-relay. The second indication information may include $n_{DMRS}$ and $I_{PRB\_RA}^{lowest\_index}$, where $n_{DMRS}$ indicates a DMRS offset, and $I_{PRB\_RA}^{lowest\_index}$ indicates a minimum index of a PRB for uplink transmission. A person skilled in the art should understand that, because the UE directly receives the reply from the base station, the reply may be understood as one type of the downlink data sent by the base station to the UE.

With reference to the network shown in FIG. 1, the method shown in FIG. 4 is further described in a scenario A and a scenario B below.

In the scenario A, the uplink UE-relay is the UE 2, the user equipment UE 1 sends uplink data to the base station by using the UE 2, and the UE 1 directly receives downlink data from the base station.

Figure 5:
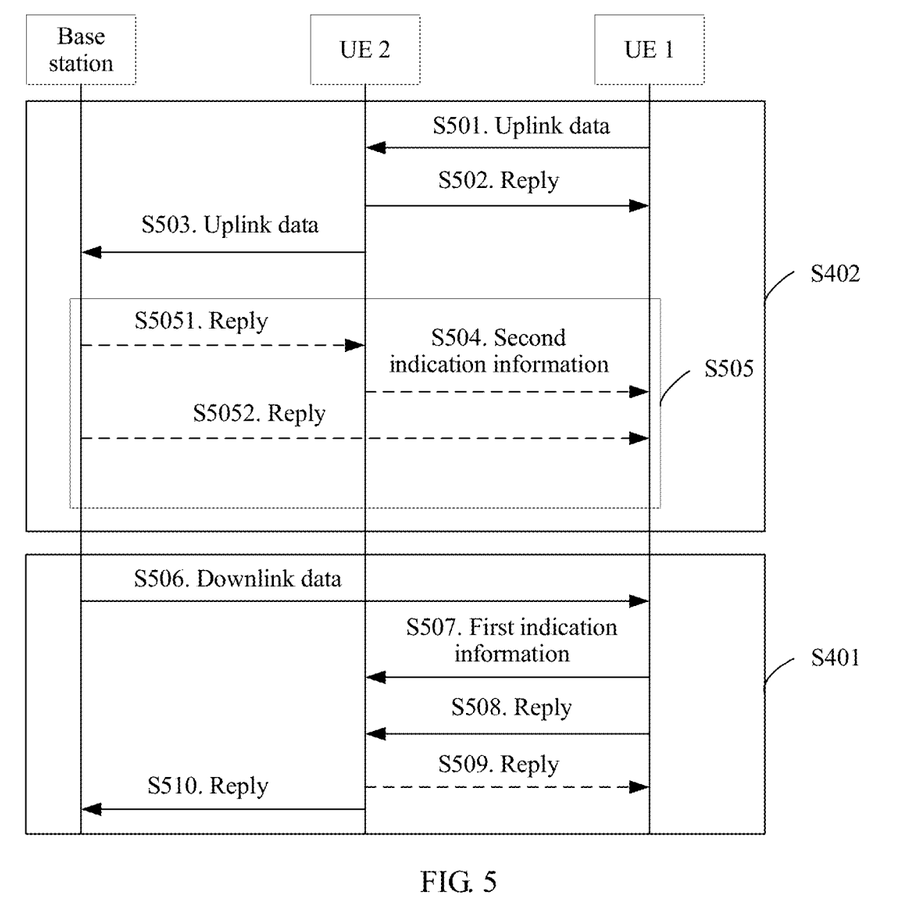
FIG. 5 is a schematic diagram of another data transmission method according to an embodiment of the present application.

As shown in FIG. 5:

S501. The UE 1 sends uplink data to the UE 2.

The UE 1 may send the uplink data to the UE 2 in a unicast or broadcast manner.

Optionally, in S502, the UE 2 sends a reply to the uplink data to the UE 1.

For example, the reply may be an ACK or a NACK. When the UE 1 receives the NACK, the UE 1 may resend the uplink data to the UE 2.

S503. The UE 2 sends the uplink data to the base station.

For example, the UE 2 may send the uplink data to the base station by using a physical uplink shared channel (PUSCH) resource configured by the base station for the UE 2.

For example, the PUSCH resource may be obtained by the UE 2 by using a scheduling request (SR).

S505. The base station sends a reply to the uplink data.

For example, the base station sends the reply according to a PHICH resource allocated to the UE 2.

The reply sent by the base station on the PHICH resource may be received by the UE 2 (refer to S5051), or may be received by the UE 1 (refer to S504 and S5052).

Optionally, in S5051, the UE 2 receives the reply of the base station to the uplink data on a PHICH resource allocated by the base station to the UE 2.

Optionally, in S504, the UE 2 sends second indication information to the UE 1, where the second indication information indicates the PHICH resource. In this way, the UE 1 may receive the reply of the base station to the uplink data on the PHICH resource. For the second indication information, refer to the second indication information in FIG. 4. Details are not described herein again.

Optionally, in S5052, the UE 1 receives the reply of the base station to the uplink data on the PHICH resource allocated by the base station to the UE 2.

S501 to S505 provide a specific implementation of S402 as an example.

S506 to S510 provide a specific implementation of S401 as an example.

S506. The base station sends downlink data to the UE 1.

For example, the base station sends the downlink data to the UE 1 by using a physical downlink shared channel (PDSCH) resource.

S507. The UE 1 sends first indication information to the UE 2.

The first indication information indicates a PUCCH resource corresponding to the UE 1, that is, a PUCCH resource configured for the UE 1. For the first indication information, refer to the first indication information in FIG. 4. Details are not described herein again.

S508. The UE 1 sends a reply to the downlink data to the UE 2.

Optionally, the UE 1 may further send a periodic CQI to the UE 2.

A sequence between S507 and S508 is not limited. The UE 1 may send the second indication information, the reply to the downlink data, or the periodic CQI to the UE 2 in a broadcast or unicast manner.

Optionally, in S509, the UE 2 sends a reply to the first indication information, a reply to the downlink data, or a reply to the periodic CQI to the UE 1.

S510. The UE 2 sends the reply of the UE 1 to the downlink data to the base station.

For example, the UE 2 sends the reply of the UE 1 to the downlink data to the base station according to the PUCCH resource configured for the UE 1.

It can be learned, from the description of the method shown in FIG. 5, that uplink data and downlink data are transmitted in different transmission paths, so as to reduce impact of a user equipment relay on transmission reliability. When a fault occurs in an uplink, the base station may further contact the user equipment in a downlink, so as to perform subsequent remedies, and improve network reliability.

Figure 6:
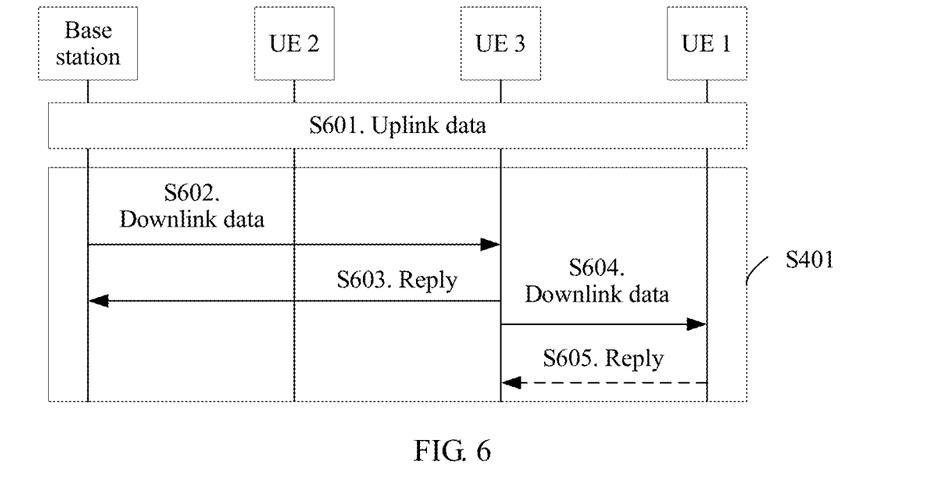
FIG. 6 is a schematic diagram of still another data transmission method according to an embodiment of the present application.

In the scenario B, the downlink UE-relay is the UE 3, and the uplink UE-relay is the UE 2. The UE 1 sends uplink data to the base station by using the UE 2, and receives downlink data from the base station by using the UE 3. The UE 1 may be in coverage of the base station or may be outside coverage of the base station.

As shown in FIG. 6:

S601. The UE 1 sends uplink data by using the UE 2.

For example, for an example in which the UE 1 sends the uplink data by using the UE 2, refer to S501 to S505. Details are not described herein again.

For example, S602 to S605 provide one of specific implementations of S401 as an example.

S602. The base station sends downlink data to the UE 3.

For example, the base station sends the downlink data to the UE 3 by using a PDSCH resource in S602.

S603. The UE 3 sends a reply of the UE 3 to the downlink data to the base station.

For example, the UE 3 may send the reply to the downlink data to the base station according to a PUCCH resource configured for the UE 3.

S604. The UE 3 sends the downlink data to the UE 1.

For example, the UE 3 may send the downlink data to the UE 1 in a broadcast or unicast manner.

Optionally, in S605, the UE 1 sends a reply of the UE 1 to the downlink data to the UE 3.

In this embodiment of the present application, different user equipment relays separately forward the uplink data and the downlink data of the user equipment, so as to reduce impact of a fault of a single user equipment relay on a network, and improve network reliability.

A person skilled in the art may understand that an embodiment of the present application further provides user equipment. For a structure of the user equipment, refer to FIG. 2. For a mechanism used by the user equipment to implement an objective of this embodiment of the present application, refer to the UE 1 in the foregoing embodiments. Details are not described herein again.

A person skilled in the art may understand that an embodiment of the present application further provides user equipment, and the user equipment is used as a user equipment relay. For a structure of the user equipment, refer to FIG. 2. For a mechanism used by the user equipment to implement an objective of this embodiment of the present application, refer to the UE 2 in the foregoing embodiments. Details are not described herein again.

A person skilled in the art may understand that an embodiment of the present application further provides a base station. For a structure of the base station, refer to FIG. 3. For a mechanism used by the base station to implement an objective of this embodiment of the present application, refer to the base station in the foregoing embodiments. Details are not described herein again.

A person skilled in the art may understand that an embodiment of the present application further provides a data transmission system, so as to implement an objective of this embodiment of the present application. The system may include UE 1 and UE 2, and may further include a base station or UE 3. For a mechanism used by the system to implement the method provided in the embodiments of the present application, refer to the foregoing embodiments. Details are not described herein again.

A person skilled in the art may further understand that various illustrative logical blocks and steps that are listed in the embodiments of the present application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be understood that the implementation goes beyond the protection scope of the embodiments of present application.

The various illustrative logical units and circuits described in the embodiments of the present application may implement or operate the described functions by using a general purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general purpose processor may be a microprocessor. Optionally, the general purpose processor may be any conventional processor, controller, microcontroller, or state machine. The processor may also be implemented by a combination of computing apparatuses such as a digital signal processor and a microprocessor, multiple microprocessors, one or more microprocessors with a digital signal processor core, or any other similar configuration.

Steps of the methods or algorithms described in the embodiments of the present application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Alternatively, the storage medium may be integrated into the processor. The processor and the storage medium may be arranged in an ASIC, and the ASIC may be arranged in UE. Optionally, the processor and the storage medium may be arranged in different components of the UE.

For example, in one or more designs, the functions described in the embodiments of the present application may be implemented by using hardware, software, firmware, or any combination thereof. If being implemented by using the software, these functions may be stored in a computer-readable medium or are transmitted to the computer-readable medium in a form of one or more instructions or code. The computer-readable medium includes a computer storage medium and a communications medium that enables a computer program to move from one location to another. The storage medium may be an available medium that may be accessed by any general or special computer. For example, such a computer-readable medium may include but is not limited to a RAM, a ROM, an EEPROM, a CD-ROM or another optical disc storage, a disk storage or another magnetic storage apparatus, or any other media that may be used to carry or store program code that is in a form of an instruction or a data structure or in a form that can be read by a general or special computer or by a general or special processor. In addition, any connection may be appropriately defined as a computer-readable medium. For example, if software is transmitted from a website, a server, or another remote resource by using a coaxial cable, an optical fiber, a twisted pair, or a digital subscriber line (DSL) and in a wireless manner such as infrared, radio, or microwave, the software is included in a defined computer-readable medium. The disc and the disk include a compressed disk, a laser disk, an optical disc, a DVD, a floppy disk, and a Blu-ray disc. The disk generally copies data in a magnetic manner, and the disc generally copies data optically in a laser manner. The foregoing combination may also be included in the computer-readable medium.

According to the foregoing description of this specification in the present application, technologies in the art may use or implement the content of the present application. Any modification based on the disclosed content shall be considered obvious in the art. The basic principles described in the present application may be applied to other variations without departing from the essence and scope of the present application. Therefore, the content disclosed in the present application is not limited to the described embodiments and designs but may also be extended to a maximum scope that is consistent with the principles and disclosed new features of the present application.

What is claimed is:

1. A data transmission method, comprising:
    sending, by user equipment (UE), uplink data to a base station by using an uplink user equipment relay (uplink UE-relay), wherein the uplink UE-relay comprises a second UE;
    receiving, by the UE, downlink data from the base station; and
    receiving, by the UE, indication information from the uplink UE-relay, wherein the indication information indicates a downlink transmission resource corresponding to the uplink UE-relay; and, wherein
    the downlink data is a response to the uplink data, and the downlink data is received, by the UE and the uplink UE-relay, from the base station according to the downlink transmission resource.

2. The method according to claim 1, wherein the indication information is second indication information, the method further comprising:
    sending, by the UE, first indication information to the uplink UE-relay, wherein the first indication information indicates an uplink transmission resource corresponding to the UE, so that the uplink UE-relay sends the uplink data to the base station according to the uplink transmission resource.

3. The method according to claim 2, wherein
    the uplink transmission resource comprises a physical uplink control channel (PUCCH) resource; and
    the first indication information comprises $n_{CCE}$ and $N_{PUCCH}^{(1)}$, wherein $n_{CCE}$ indicates a number of a first control channel element (CCE) that is in a physical downlink control channel (PDCCH) and that indicates downlink transmission, and $N_{PUCCH}^{(1)}$ indicates a UE-dedicated PUCCH ACK/NACK resource offset or indicates a PUCCH format 1a/1b start offset used for a subframe set K2.

4. The method according to claim 2, wherein
the downlink transmission resource comprises a physical hybrid automatic repeat request indicator channel (PHICH) resource; and
the second indication information comprises $n_{DMRS}$ and $I_{PRB\_RA}^{lowest\_index}$, wherein $n_{DMRS}$ indicates a demodulation reference signal (DMRS) offset, and $I_{PRB\_RA}^{lowest\_index}$ indicates a minimum index of a physical resource block (PRB) for uplink transmission.

5. The method according to claim 1, further comprising:
receiving, by the UE, a reply of the uplink UE-relay to the uplink data from the uplink UE-relay.

6. The method according to claim 1, wherein the UE receives the downlink data from the base station by using a downlink UE-relay, wherein the downlink UE-relay comprises a third UE, and the method further comprises:
sending, by the UE, a reply of the UE to the downlink data to the downlink UE-relay.

7. A data transmission method, comprising:
receiving, by a base station, uplink data of user equipment (UE) by using an uplink user equipment relay (uplink UE-relay), wherein the uplink UE-relay comprises a second UE;
sending, by the base station, downlink data to the UE, wherein the downlink data is a response to the uplink data;
sending, by the base station, the downlink data to the uplink UE-relay according to a downlink transmission resource corresponding to the uplink UE-relay;
transmitting, to the UE, indication information from the uplink UE-relay, wherein the indication information indicates the downlink transmission resource; and, wherein
UE is configured to receive the downlink data according to the downlink transmission resource.

8. The method according to claim 7, wherein receiving, by the base station, uplink data of user equipment (UE) by using the uplink user equipment relay (uplink UE-relay) comprises:
receiving, by the base station, the uplink data of the UE from the uplink UE-relay according to an uplink transmission resource corresponding to the UE.

9. The method according to claim 8, wherein receiving, by the base station, the uplink data of the UE from the uplink UE-relay according to the uplink transmission resource corresponding to the UE comprises:
receiving, by the base station, the uplink data from the uplink UE-relay according to the uplink transmission resource after a delay of m transmission time intervals (TTIs), wherein m is a positive integer.

10. User equipment, comprising:
a processor and a memory associated with the processor, wherein
the memory comprises an instruction to be executed by the processor, wherein when the instruction is executed, the processor is caused to perform:
sending uplink data to a base station by using an uplink user equipment relay (uplink UE-relay), wherein the uplink UE-relay comprises a second UE;
receiving downlink data from the base station, and receiving indication information from the uplink UE-relay, wherein the indication information indicates a downlink transmission resource corresponding to the uplink UE-relay; and, wherein
the downlink data is a response to the uplink data, and the downlink data is received, by the UE and the uplink UE-relay, from the base station according to the downlink transmission resource.

11. The user equipment according to claim 10, wherein the indication information is second indication information, and wherein the processor is further caused to perform:
sending first indication information to the uplink UE-relay, wherein the first indication information indicates an uplink transmission resource corresponding to the UE, so that the uplink UE-relay sends the uplink data to the base station according to the uplink transmission resource.

12. The user equipment according to claim 11, wherein
the uplink transmission resource comprises a physical uplink control channel (PUCCH) resource; and
the first indication information comprises $n_{CCE}$ and $N_{PUCCH}^{(1)}$, wherein $n_{CCE}$ indicates a number of a first control channel element (CCE) that is in a physical downlink control channel (PDCCH) and that indicates downlink transmission, and $N_{PUCCH}^{(1)}$ indicates a UE-dedicated PUCCH ACK/NACK resource offset or indicates a PUCCH format 1a/1b start offset for a subframe set K2.

13. The user equipment according to claim 11, wherein
the downlink transmission resource comprises a physical hybrid automatic repeat request indicator channel (PHICH) resource; and
the second indication information comprises $n_{DMRS}$ and $I_{PRB\_RA}^{lowest\_index}$, wherein $n_{DMRS}$ indicates a demodulation reference signal (DMRS) offset, and $I_{PRB\_RA}^{lowest\_index}$ indicates a minimum index of a physical resource block (PRB) for uplink transmission.

14. The user equipment according to claim 10, wherein
the processor is further caused to perform: receiving a reply of the uplink UE-relay to the uplink data from the uplink UE-relay.

15. The user equipment according to claim 10, wherein the downlink data is received from the base station by using a downlink UE-relay, wherein the downlink UE-relay comprises a third UE, and the processor is further caused to perform: sending a reply of the user equipment to the downlink data to the downlink UE-relay.

16. A base station, comprising:
a processor and a memory associated with the processor, wherein
the memory comprises an instruction to be executed by the processor, wherein when the instruction is executed, the processor is caused to perform:
receiving uplink data of user equipment (UE) by using an uplink user equipment relay (uplink UE-relay), wherein the uplink UE-relay comprises a second UE;
sending downlink data to the UE, wherein the downlink data is a response to the uplink data;
sending the downlink data to the uplink UE-relay according to a downlink transmission resource corresponding to the uplink UE-relay; and;
transmitting, to the UE, indication information from the uplink UE-relay, wherein the indication information indicates the downlink transmission resource; and, wherein
UE is configured to receive downlink data according to the downlink transmission resource.

17. The base station according to claim 16, wherein receiving the uplink data of UE by using the uplink UE-relay comprises: receiving the uplink data of the UE from the uplink UE-relay according to an uplink transmission resource corresponding to the UE.

18. The base station according to claim 17, wherein receiving the uplink data of the UE from the uplink UE-relay according to the uplink transmission resource corresponding to the UE comprises: receiving the uplink data from the uplink UE-relay according to the uplink transmission resource after a delay of m transmission time intervals (TTIs).

* * * * *